(12) United States Patent
Borra et al.

(10) Patent No.: US 11,856,673 B2
(45) Date of Patent: Dec. 26, 2023

(54) DETERMINING A LIGHT EFFECT BASED ON AN AVERAGE COLOR AFTER A DETECTED TRANSITION IN CONTENT

(71) Applicant: SIGNIFY HOLDING B.V., Eindhoven (NL)

(72) Inventors: Tobias Borra, Rijswijk (NL); Cornelis Teunissen, Eindhoven (NL); Marcus Theodorus Maria Lambooij, Eindhoven (NL); Dzmitry Viktorovich Aliakseyeu, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 312 days.

(21) Appl. No.: 17/429,727

(22) PCT Filed: Feb. 10, 2020

(86) PCT No.: PCT/EP2020/053321
§ 371 (c)(1),
(2) Date: Aug. 10, 2021

(87) PCT Pub. No.: WO2020/165088
PCT Pub. Date: Aug. 20, 2020

(65) Prior Publication Data
US 2022/0124896 A1 Apr. 21, 2022

(30) Foreign Application Priority Data
Feb. 13, 2019 (EP) .................................... 19156956

(51) Int. Cl.
*H05B 47/155* (2020.01)

(52) U.S. Cl.
CPC .................................. *H05B 47/155* (2020.01)

(58) Field of Classification Search
CPC ...... H05B 47/10; H05B 47/105; H05B 47/11; H05B 47/115; H05B 47/155;
(Continued)

(56) References Cited

U.S. PATENT DOCUMENTS 10,368,424 B2 * 7/2019 Engelen ................. H05B 45/20
2018/0070433 A1 3/2018 Paolini et al.
(Continued)

FOREIGN PATENT DOCUMENTS

EP 2139299 B1 3/2011
WO 2005069639 A1 7/2005
(Continued)

*Primary Examiner* — Haissa Philogene

(57) ABSTRACT

A method comprises obtaining (101) media content information, e.g. media content, determining (103) a first color value based on a color value extracted from a current frame of the content, determining (105) one or more second color values based on one or more color values extracted from a plurality of previous sequential frames of the content and adjusting (109) a first weight for weighting the first color value in a calculation of an average color, one or more second weights for weighting the one or more second color values in the calculation of the average color, and/or the one or more second values upon detecting (107) a transition in the content. The method further comprises calculating (111) the average color from the first color value and the one or more second color values and determining (113) one or more light effects based on the average color.

14 Claims, 4 Drawing Sheets

(58) Field of Classification Search
CPC .... H05B 47/165; H05B 47/175; H05B 47/16; H05B 45/20; Y02B 20/40
See application file for complete search history.

(56) References Cited

U.S. PATENT DOCUMENTS

2019/0069375 A1* 2/2019 Baker .............. H04N 21/43635
2021/0162912 A1* 6/2021 Spero .................. H05B 45/395

FOREIGN PATENT DOCUMENTS

WO      2007113740 A1   10/2007
WO      2011073877 A1    6/2011

* cited by examiner

DETERMINING A LIGHT EFFECT BASED ON AN AVERAGE COLOR AFTER A DETECTED TRANSITION IN CONTENT

CROSS-REFERENCE TO PRIOR APPLICATIONS

This application is the U.S. National Phase application under 35 U.S.C. § 371 of International Application No. PCT/EP2020/053321, filed on Feb. 10, 2020, which claims the benefit of European Patent Application No. 19156956.5, filed on Feb. 13, 2019. These applications are hereby incorporated by reference herein.

FIELD OF THE INVENTION

The invention relates to a system for determining a light effect to be rendered while media content is being rendered, said light effect being determined based on an average of a plurality of color values, said plurality of color values being extracted from a plurality of frames of said media content.

The invention further relates to a method of determining a light effect to be rendered while media content is being rendered, said light effect being determined based on an average of a plurality of color values, said plurality of color values being extracted from a plurality of frames of said media content.

The invention also relates to a computer program product enabling a computer system, e.g. a PC or mobile phone, to perform such a method.

BACKGROUND OF THE INVENTION

One of the main benefits of having a dynamic lighting system is to extend the content that is displayed on a screen. By allowing the lighting system to dynamically display colors in the room that are extracted from the content, an enhanced experience can be offered.

In Philips Hue Sync, to be able to offer a smooth experience, colors that are extracted from the content are temporally smoothed, to prevent jitter and or flicker effects, not only in intensity but also in chromaticity. The current implementation of Hue Sync implements a recursive filter, which uses previously extracted colors, and weights them in conjunction with the current extracted color. A transition between the previous color and the current extracted color is then enabled, where the transition speed is determined by the weights of the filter coefficients. However, a direct result of this mechanism is the fact that colors that are displayed on the lamps may lag behind colors on the screen.

This lag may become more prominent when the filter settings are set to "subtle" (high contribution of history), effectively making the transitions slower by putting more weight on previous extracted colors. Since content is usually changing on a per-frame basis, this lag will hardly be noticeable. However, when the extracted color does not vary over a number of frames (e.g. when content is paused), the extracted color is effectively locked in position. If the extracted color is black, then a default illumination could be rendered during the pausing, as disclosed in US 2018/0070433A1, but this would not solve the problem that when the extracted color has changed (e.g. after pausing), it might take quite some time for colors displayed on the lamps to catch up again with the colors on the screen, depending on the recursive filter settings.

SUMMARY OF THE INVENTION

It is a first object of the invention to provide a system, which is able to reduce noticeable lag in content-based light effects.

It is a second object of the invention to provide a method, which is able to reduce noticeable lag in content-based light effects.

In a first aspect of the invention, the system comprises at least one input interface, at least one output interface, and at least one processor configured to use said at least one input interface to obtain media content information comprising media content and/or color values extracted from said media content, determine a first color value based on a color value extracted from a current frame of said media content, determine one or more second color values based on one or more color values extracted from a plurality of previous sequential frames of said media content, and detect a transition in said media content and/or in a rendering of said media content.

The at least one processor is further configured to adjust a first weight for weighting said first color value in a calculation of an average color, one or more second weights for weighting said one or more second color values in said calculation of said average color, and/or said one or more second values upon detecting said transition in said media content, calculate said average color from said first color value and said one or more second color values, determine one or more light effects based on said average color, and use said at least one output interface to control one or more lighting devices to render said one or more light effects and/or store a light script specifying said one or more light effects.

By adjusting the first weight, the one or more second weights and/or the one or more second values upon detecting the transition in the media content, the impact of the color values extracted from the previous sequential frames, rendered during and/or before the transition, on the light effects to be rendered after the transition, may be reduced, thereby reducing noticeable lag by enabling an immediate catch-up of the lamp behavior in sync with the color transition on the screen. For example, the afore-mentioned recursive filter may be reset, e.g. when pause/play or a scene change is detected, to enable a faster catching up of the lamp behavior. This reduces apparent non-responsiveness of the lamps, which would otherwise appear immediately after content is paused if the extracted video remains unchanged for more than a certain number of seconds during the pausing.

Said system may be part of a lighting system which comprises one or more lighting devices or may be used in a lighting system which comprises one or more light devices, for example. Said at least one processor may be configured to calculate said average color by calculating a mean, trimean, median or mode color from said first color value and said one or more second color values, for example. The average may be a weighted average, for example.

Said transition may comprise a transition between said media content being paused, fast forwarded, reversed or skipped and said media content being rendered normally, for example. Said at least one processor may be configured to detect said transition by detecting that normal rendering of said media content is resumed after an interruption of said rendering and adjust said first weight, said one or more second weights, and/or said one or more second values upon detecting that said normal rendering is resumed. This is beneficial when the light effects are created in real-time while the media content is being rendered.

Alternatively, said transition may comprise a change in a level of activity in said media content, for example. Alternatively, said transition may comprise a transition between shots and/or scenes in said media content, for example. These transitions could also be detected when light effects are not created in real-time, i.e. without the media content being rendered at the same time.

The media content may comprise one content item or multiple content items. In the latter case, the transition may comprise the transition between two content items, e.g. switching channels, stopping the current movie and immediately starting a different movie, a news program followed by a movie. This is especially beneficial when the light effects are generated and rendered in real-time.

Content generated by an app, e.g. when movie viewing is interrupted by a video call and the video calling app displays the video call on screen, is also considered to be a content item. Two content items may be displayed simultaneously, e.g. part of the time. For example, a first content item may be a movie, a game or a TV program and a second content item may be an overlay, e.g. generated by an app. For example, when a person receives a video call, the video calling app may display the video call as an overlay on screen. The addition and/or removal of an overlay may be regarded as a transition. Thus, a transition in the media content and/or the rendering of the media content may be caused by an external factor.

Said at least one processor may be configured to replace said one or more second color values by said first color value (in at least one iteration). The same effect may be achieved by configuring said at least one processor to reduce said one or more second weights to zero (in at least one iteration). As a result, the light effects rendered after the transition are no longer based on the video frames rendered before the transition. Alternatively, said one or more second color values may be based on a plurality of color values extracted from a plurality of sequential frames rendered immediately preceding said transition, for example.

Said at least one processor may be configured to replace said one or more second color values by one or more color values transmitted to said one or more lighting devices before said transition. This may be beneficial, for example, if the transition comprises a transition between the media content being paused and being rendered normally and these transmitted one or more color values are different than the first color value, e.g. if a black screen or an advertisement is shown during a pause and the first color is based on this black screen or advertisement instead of based on the last image rendered before the pausing.

Said at least one processor may be configured to reduce said one or more second weights or increase said first weight. This allows the light effects to still be based on video frames rendered before the transition, but to a lesser degree so that the lag of the effects is less noticeable.

Said one or more second color values may comprise an average of a color value extracted from a preceding frame and a color value based on a plurality of colors values extracted from a plurality of sequential frames preceding said previous frame. In this way, a recursive filter may be implemented.

In a second aspect of the invention, the method comprises obtaining media content information comprising media content and/or color values extracted from said media content, determining a first color value based on a color value extracted from a current frame of said media content, determining one or more second color values based on one or more color values extracted from a plurality of previous sequential frames of said media content, and detecting a transition in said media content and/or in a rendering of said media content.

The method further comprises adjusting a first weight for weighting said first color value in a calculation of an average color, one or more second weights for weighting said one or more second color values in said calculation of said average color, and/or said one or more second values upon detecting said transition in said media content, calculating said average color from said first color value and said one or more second color values, determining one or more light effects based on said average color, and controlling one or more lighting devices to render said one or more light effects and/or storing a light script specifying said one or more light effects. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores a software code portion, the software code portion, when executed or processed by a computer, being configured to perform executable operations for determining a light effect to be rendered while media content is being rendered, said light effect being determined based on an average of a plurality of color values, said plurality of color values being extracted from a plurality of frames of said media content.

The executable operations comprise obtaining media content information comprising media content and/or color values extracted from said media content, determining a first color value based on a color value extracted from a current frame of said media content, determining one or more second color values based on one or more color values extracted from a plurality of previous sequential frames of said media content, detecting a transition in said media content and/or in a rendering of said media content, adjusting a first weight for weighting said first color value in a calculation of an average color, one or more second weights for weighting said one or more second color values in said calculation of said average color, and/or said one or more second values upon detecting said transition in said media content, calculating said average color from said first color value and said one or more second color values, determining one or more light effects based on said average color, and controlling one or more lighting devices to render said one or more light effects and/or storing a light script specifying said one or more light effects.

As will be appreciated by one skilled in the art, aspects of the present invention may be embodied as a device, a method or a computer program product, e.g. an app. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like, conventional procedural programming languages, such as the "C" programming language or similar programming languages, and functional programming languages such as Scala, Haskel or the like. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
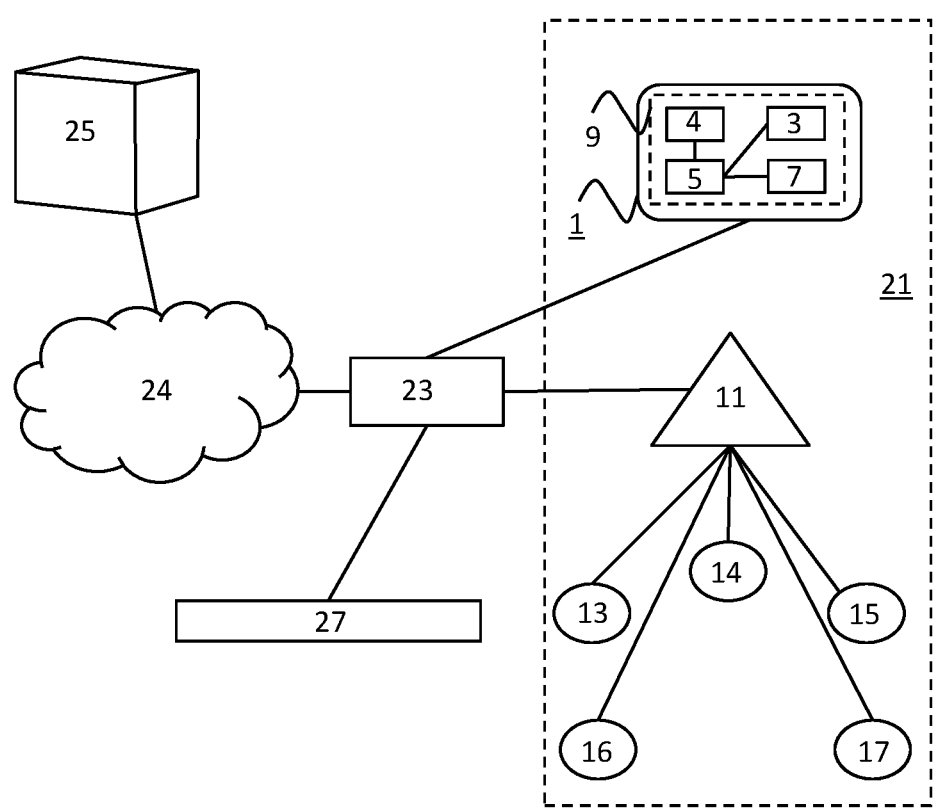
FIG. 1 is a block diagram of an embodiment of the system.

FIG. 1 shows an embodiment of the system for determining a light effect to be rendered while media content is being rendered: mobile device 1. The light effect is determined based on an average of a plurality of color values and the color values are extracted from a plurality of frames of the media content in order to offer a smoother experience.

Mobile device 1 is connected to a wireless LAN access point 23. A bridge 11 is also connected to the wireless LAN access point 23, e.g. via Ethernet. Lighting devices 13-17 communicate wirelessly with the bridge 11, e.g. using the Zigbee protocol, and can be controlled via the bridge 11, e.g. by the mobile device 1. The bridge 11 may be a Philips Hue bridge and the lighting devices 13-17 may be Philips Hue lights, for example. In an alternative embodiment, lighting devices are controlled without a bridge.

A TV 27 is also connected to the wireless LAN access point 23. The media content may be rendered by the mobile device 1 and/or by the TV 27, for example. In the latter case, the mobile device 1 may output the media content to be rendered on the TV 27 to the TV 27 (e.g. using Wi-Fi Miracast or wired HDMI output). The wireless LAN access point 23 is connected to the Internet 24. An Internet server 25 is also connected to the Internet 24. The mobile device 1 may be a mobile phone or a tablet, for example. The mobile device 1 may run the Philips Hue Sync app, for example.

The mobile device 1 comprises a processor 5, a receiver 3, a transmitter 4, a memory 7, and a display 9. In the embodiment of FIG. 1, the display 9 comprises a touchscreen. The mobile device 1, the bridge 11 and the lighting devices 13-17 are part of lighting system 21.

In the embodiment of FIG. 1, the processor 5 is configured to use the receiver 3 to obtain media content information comprising media content and/or color values extracted from the media content. Thus, the color values are extracted from the media content on the mobile device 1 or on a different device. In the former case, the media content may be streamed to the mobile device 1 from the Internet 25. In the latter case, the color values received by the mobile device 1 may be associated with time stamps and a light effect may be stored in a light script such that it is associated with the timestamp of one of the color values on which the light effect was based (e.g. the one that was received last).

The processor 5 is further configured to determine a first color value based on a color value extracted from a current frame of the media content and determine one or more second color values based on one or more color values extracted from a plurality of previous sequential frames of the media content.

The processor 5 is further configured to detect a transition in the media content and adjust a first weight for weighting the first color value in a calculation of an average color, one or more second weights for weighting the one or more second color values in the calculation of the average color, and/or the one or more second values upon detecting the transition in the media content.

The processor 5 is also configured to calculate the average color from the first color value and the one or more second color values, determine one or more light effects based on the average color, and use the transmitter 4 to control one or more of lighting devices 13-17 to render the one or more light effects and/or store a light script specifying the one or more light effects, e.g. in memory 7 or on server 25. The light script may specify the timing, color and duration of light effects, for example.

The transition may comprise a transition between the media content being paused, fast forwarded, reversed or skipped and the media content being rendered normally, a change in a level of activity in the media content, or a transition between shots and/or scenes in the media content, for example.

The described system eliminates discrepancies between content on a display and behavior of a connected lighting system. For example, a hard reset of a recursive filter may be performed whenever a pause/play event is detected or when fast forward or backward is detected. The recursive filter may also be reset when a long period of screen inactivity (e.g. screen saver) is detected as soon as activity is detected again.

Alternatively, in the case of pausing, the latest light values sent to the lamp just before the pausing may be stored. As soon as the video is resumed, the remembered values may be used to set the filter. Alternatively, the filter coefficients that define how fast the change occurs could be adjusted for a short moment to allow lights to catch up faster. Alternatively, scene-change and/or shot transition detection algorithms can also be used to reset the filter or (temporarily) re-adjust the recursive filter settings.

Preferably, whenever the content on the screen is unchanged for a certain period of time (e.g. resulting in a low standard deviation for the temporal variations in the extracted video), and then suddenly changes, the recursive filter is reset, allowing for a direct continuation of lamp behavior in sync with the content, i.e. an immediate catch-up of the lamp behavior in sync with the color transition on the screen.

In the embodiment of the mobile device 1 shown in FIG. 1, the mobile device 1 comprises one processor 5. In an alternative embodiment, the mobile device 1 comprises multiple processors. The processor 5 of the mobile device 1 may be a general-purpose processor, e.g. from Qualcomm or ARM-based, or an application-specific processor. The processor 5 of the mobile device 1 may run a Windows, a macOS, an Android or iOS operating system for example. The memory 7 may comprise one or more memory units. The memory 7 may comprise solid-state memory, for example. The memory 7 may be used to store an operating system, applications and application data, for example.

The receiver 3 and the transmitter 4 may use one or more wireless communication technologies such as Wi-Fi (IEEE 802.11) to communicate with the wireless LAN access point 23, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The display 9 may comprise an LCD or OLED panel, for example. The mobile device 1 may comprise other components typical for a mobile device such as a battery and a power connector. The invention may be implemented using a computer program running on one or more processors.

In the embodiment of FIG. 1, the system of the invention is a mobile device. In an alternative embodiment, the system of the invention is a different device, e.g. a PC or a video module, or comprises multiple devices. The video module may be a dedicated HDMI module that can be put between the TV and the device providing the HDMI input in order to analyze the HDMI input, (e.g. when the HDMI input is not protected with HDCP) for example.

Figure 2:
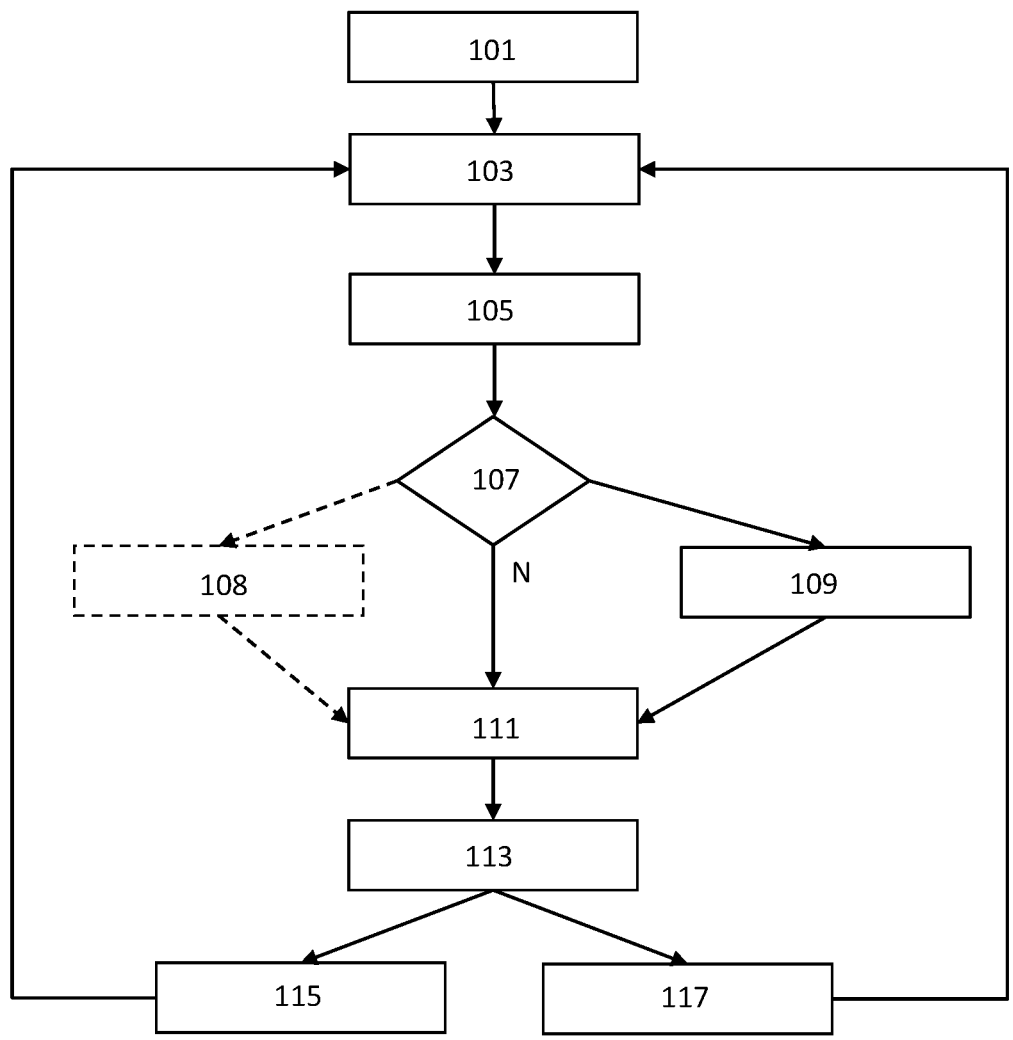
FIG. 2 is a flow diagram of a first embodiment of the method.

A first embodiment of the method of determining a light effect to be rendered while media content is being rendered is shown in FIG. 2. The light effect is determined based on an average of a plurality of color values. The color values are extracted from a plurality of frames of the media content. A step 101 comprises obtaining media content information comprising media content and/or color values extracted from the media content.

A step 103 comprises determining a first color value based on a color value extracted from a current frame of the media content. A step 105 comprises determining one or more second color values based on one or more color values extracted from a plurality of previous sequential frames of the media content. A step 107 comprises determining whether a transition in the media content or the rendering of the media content has occurred since the previous iteration.

If a transition of a first set of transition types is detected, step 108 is performed. If a transition of a second set of transition types is detected, step 109 is performed. If no transition or a transition of a third set of transition types is detected, step 111 is performed. The first set should not be empty. The second set and/or the third set may be empty. There may be overlap between the first set and the second set. For example, if pausing of the media content (rendering) is detected, only step 109 may be performed or both steps 108 and 109 may be performed. Step 111 is performed after steps 108 and 109.

Step 109 comprises adjusting a first weight for weighting the first color value in a calculation of an average color, one or more second weights for weighting the one or more second color values in the calculation of the average color, and/or the one or more second values. When weights are adjusted in the embodiment of FIG. 2, they are only adjusted during the current iteration. The original weights are used again in the next iteration.

Optional step 108 comprises storing the average color determined in the previous iteration, e.g. in a variable. Step 108 may be performed if pausing of the media content is detected, for example. The stored average color may be used in a future iteration of step 111, e.g. after a resumption of the media content is detected. Step 111 comprises calculating the average color from the first color value and the one or more second color values. Step 111 may comprise calculating a mean, trimean, median or mode color from the first color value and the one or more second color values, for example.

Step 113 comprises determining one or more light effects based on the average color. Step 115 and/or step 117 are performed after step 113. Step 115 comprises controlling one or more lighting devices to render the one or more light effects. Step 117 comprises storing a portion of a light script specifying the one or more light effects. If the end of the media content has not been reached yet, step 103 is performed again after step 115 or step 117. In an alternative embodiment, the light script is not stored until the end of the media content has been reached and all light effects have been determined.

Figure 3:
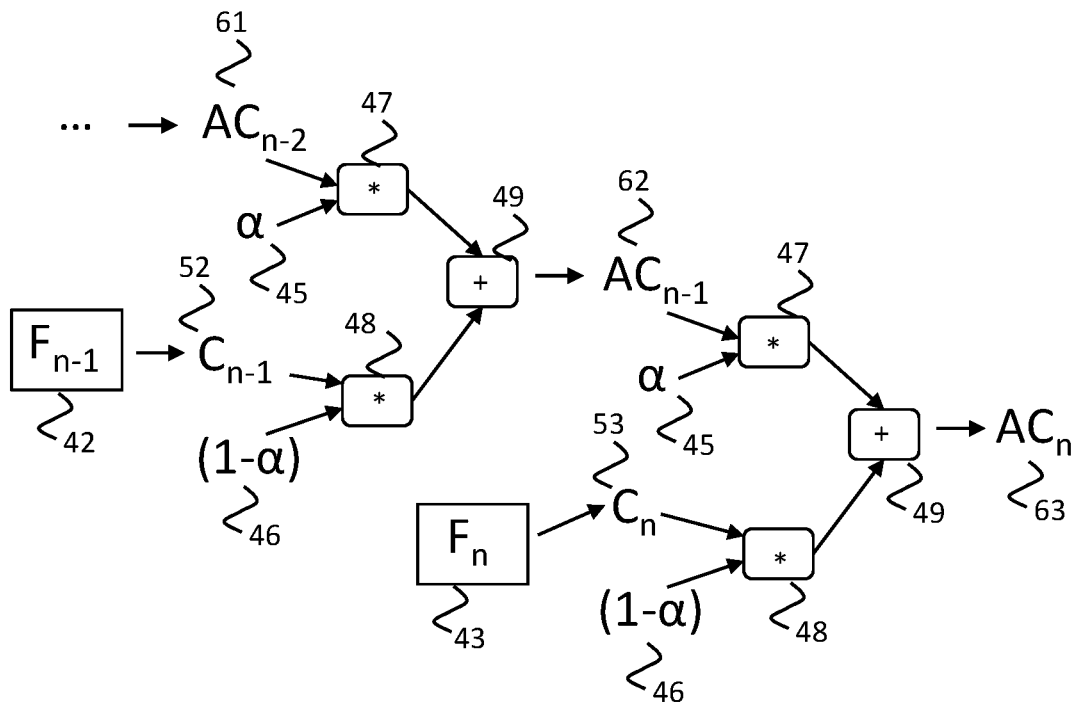
FIG. 3 illustrates the execution of a second embodiment of the method in which a recursive filter is used.

FIG. 3 illustrates the execution of a second embodiment of the method in which a recursive filter is used. FIG. 3 shows how an average color 63 ($AC_n$) is calculated from the first color value 53 ($C_n$) and the second color value 62 ($AC_{n-1}$). The first color value 53 ($C_n$) is a color value extracted from a current frame 43 ($F_n$) of the media content, e.g. by determining an average color of the frame or of a region of the frame. The second color value 62 ($AC_{n-1}$) is an average color that has been calculated in a previous iteration and is obtained from a memory.

The first color value 53 ($C_n$) is multiplied with a first weight 46 in step 48. In the embodiment of FIG. 3, the first weight 46 is (1−α) of which a has a value between 0 and 1. The second color value 62 ($AC_{n-1}$) is multiplied with a second weight 45 in step 47. In the embodiment of FIG. 3, the second weight 45 is a. A higher value for a results in a higher contribution of history. The two multiplications are added (summed up) in step 49. Steps 47,48 and 49 can be represented by the following equation:

$$AC_n = (1-\alpha)*C_n + \alpha*AC_{n-1} \quad \text{(Equation 1)}$$

Second color value 62 ($AC_{n-1}$) was calculated using this same equation from the first color value 52 ($C_{n-1}$) and the second color value 61 ($AC_{n-2}$). The first color value 52 ($C_{n-1}$) is a color value that was extracted from a previous frame 42 ($F_{n-1}$) of the media content. Previous second/average color values were generally calculated in the same manner. Thus, the second color value 62 ($AC_{n-1}$) comprises a (weighted) average of a color value extracted from a preceding frame and a color value based on a plurality of colors values extracted from a plurality of sequential frames preceding the previous frame.

In the embodiment of FIG. 3, the first weight 46 is (1-α) and the second weight 45 is α. In an alternative embodiment, the first weight 46 is a and the second weight 45 is (1−α).

The first colors $C_i$ and second colors $AC_i$ typically comprise multiple components, e.g. one for red, one for green and one for blue. If $C_i$ is equal to ($R_i$, $G_i$, $B_i$), then the calculation $(1-\alpha)*C_n$ would result in $((1-\alpha)*R_i, (1-\alpha)*G, (1-\alpha)*B_i)$. In the example of FIG. 3, one average color is determined per video frame. However, it sometimes beneficial to determine multiple average colors per video frame. For example, a first average color may be determined for a light effect to be rendered left of a display based on analysis of a left part of the video frame and a second average color may be determined for a light effect to be rendered right of a display based on a right part of the video frame.

When the method of FIG. 3 is started, i.e. when $AC_1$ is determined based on the first color value $C_1$ extracted from first frame Fi, no average color has been calculated yet and the value of $AC_0$ therefore has to be determined in different manner. $AC_0$ may be given the same value as $C_1$, for example. If content is already being rendered when the method is started, e.g. when an app that performs the method is started or after pressing a start button in this app, then the first frame Fi may not be the first frame that is rendered, but the first frame that is analyzed.

When a transition is detected, second weight 45 (and thus first weight 46) and/or a second color value is/are adjusted. For example, a transition may be detected by detecting that normal rendering of the media content is resumed after an interruption of the rendering and the second weight 45 (and thus the first weight 46) and/or the second color value may be adjusted upon detecting that the normal rendering is resumed. The adjusted weights only need to be used in a single iteration; its original values may be used again in the next iteration.

The above-mentioned adjustments are performed to prevent that the lamps appear non-responsive or to at least reduce this effect. The following adjustments may be performed, for example, if the transition is detected at frame 43 ($F_n$), e.g. if the rendering of the media content is resumed at frame 43 ($F_n$):

Replace the second color value 62 ($AC_{n-1}$) by the first color value 53 ($C_n$). As a result, the average color 63 ($AC_n$) will be an average over two times the same first color value 53 ($C_n$). This resets the recursive filter to a color value that is based on the first frame after the transition (frame 43) and is effectively a restart of the recursive filter.

Replace the second color value 62 ($AC_{n-1}$) by a color value transmitted to the one or more lighting devices before the transition, e.g. by a previous color value $AC_n$-too (which may be stored in a variable intended for this purpose, e.g. a variable that represents the average color at the time of pausing; it is not necessary to store many average color values). This resets the recursive filter to a previous average color value, e.g. determined when the media content was paused. This will be described in relation to FIG. 4.

Reduce the second weight 45, e.g. to zero, and/or increase the first weight 46. In the embodiment of FIG. 3, reducing the second weight automatically increases the first weight 46. In an alternative embodiment, the two weights 45 and 46 are independent. By reducing the second weight 45 to zero in the embodiment of FIG. 3, the same effect is achieved as replacing the second color value 62 ($AC_{n-1}$) by the first color value 53 ($C_n$). However, by not reducing the second weight 45 to all the way to zero, the second color value 62 ($AC_{n-1}$) is still based on a plurality of color values extracted from a plurality of sequential frames rendered immediately preceding the transition, albeit to a lesser degree. An advantage of not adjusting the weights 45 and 46 in this iteration, but instead replacing the second color value 62 by the first color value 53, is that it is not necessary to restore the original values of the weights 45 and 46 in the next iteration.

A transition may also be detected by detecting that normal rendering of the media content is paused. In this case, the average color may also be determined differently during the pausing, but not necessarily by adjusting first weight 46, second weight 45 and/or a second color value.

During the pausing, the recursive filter may continue to be applied, e.g. the video frame that is paused may be repeatedly used as current frame until the media content is resumed. This may result in the lamps changing color while the media content is being paused. If it is desirable to prevent his, then the second color value 62 ($AC_{n-1}$) maybe replaced by the first color value 53 ($C_n$), such that the color of the paused video is immediately copied to the lamps. In this case, step 109 is performed upon detecting a pausing of the media content.

Alternatively, the first color value 53 ($C_n$) may be set to the same value as the second color value 62 ($AC_{n-1}$) instead of being extracted from the paused video frame, for example. This results in the lamps not reflecting the paused video frame accurately, but it does ensure that the lamps do not change color while the media content is paused. In this case step 109 is not performed upon detecting a pausing of the media content.

Figure 4:
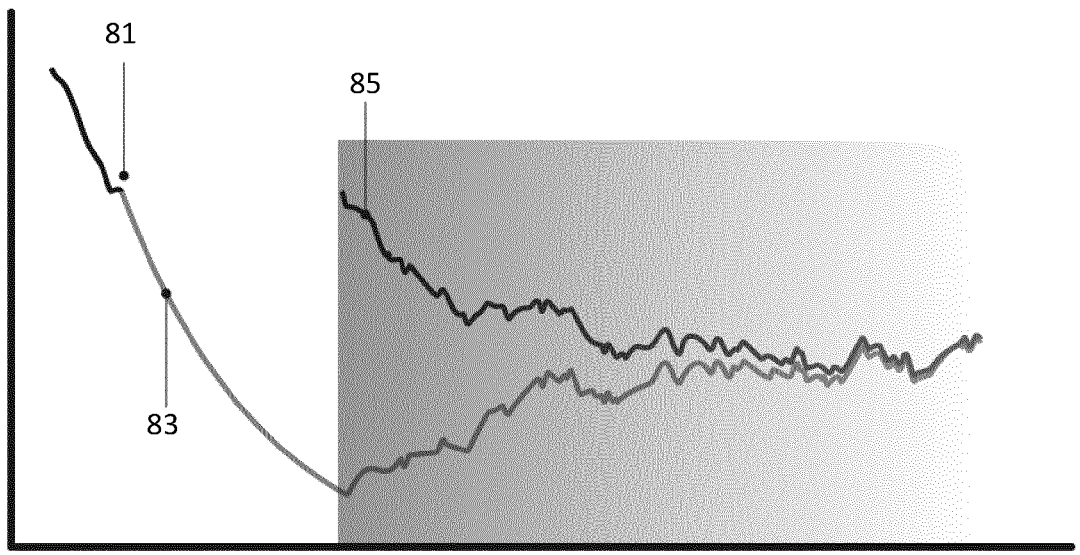
FIG. 4 depicts a graph with average color values over time with and without a reset of a recursive filter.

FIG. 4 depicts an example of a graph with average color values over time with and without a reset of a recursive filter. In the example of FIG. 4, only the average lightness over time is depicted. The lightness of the recursive filter is used to determine the intensity of the light effects rendered on the lamps.

Similar as in the embodiment of FIG. 3, the recursive filter continues to be applied while the media content is paused, but while in the embodiment of FIG. 3 the frame used by the recursive filter as current frame during the pausing is the last rendered frame, in the embodiment of FIG. 4, the frame used by the recursive filter as current frame during the pausing is a black frame.

At point 81, the media content is paused. If the recursive filter is not reset, the average lightness of the filter decreases during the pausing due to the use of a black frame as current frame, as can be seen at point 83. By implementing a hard reset of the filter when the media content is resumed, as indicated in the gray area, the lamps will immediately and accurately reflect the content without lag or discrepancies, as shown at point 85. In the example of FIG. 4, the recursive filter reverts to the average lightness determined at point 81 (and transmitted to the lamps at that moment) when the media content is resumed.

The top line, which includes point 85, represents the recursive filter with reset, i.e. without lag. The bottom line represents the recursive filter without reset, i.e. with lag. The bottom line illustrates that the recursive filter without reset will not reflect the content adequately when the media content is resumed. As can be seen, the recursive filter without reset will take quite some time to catch up with the content after the pausing, whereas the filter implementing a reset will take off immediately where the content was paused.

The period in which there is a large difference between the top line and the bottom line is typically experienced by the user as a period of unresponsiveness if the recursive filter without reset is used. In the example of FIG. 4, a pause duration of 5 seconds (150 frames), will result in a discrepancy after resuming play of about 15 seconds. Especially during the first 5-10 seconds hereof, the lamps will display behavior that will not correlate with the screen content at all. The example of FIG. 4 shows this only for the lightness of the content, but this discrepancy applies to chromaticity as well.

The discrepancy between what is happening on screen and on the lamps may be reflected in the intensity dynamics of the lamps, but in the chromaticity dynamics as well. For example, if the frame used by the recursive filter as current frame during the pausing is the last rendered frame as described in relation to FIG. 3 and the content is paused during a red screen for five seconds, the colors displayed on the lamps will be red after five seconds and will not correlate with the screen color after the content resumes play with blue content. In this scenario, if the content stays blue, the lamps will remain purple for an extended duration, e.g. 10 to 15 seconds, before catching up with the actual content, i.e. before displaying a blue color as well.

In the embodiments of FIGS. 3 and 4, a recursive filter is used. In the embodiment of FIG. 3, the average color is determined from the first color value and a single second color value. In an alternative embodiment, no recursive filter is used to determine the average color and the average color is determined from the first color value and multiple second color values. In this alternative embodiment, multiple second color values are determined, one for each frame of the previous sequential frames that are taken into account to smooth the extracted colors. The following equation may be used in the alternative embodiment:

$$AC_n = (\alpha \cdot C_n + \beta \cdot C_{n-1} + \delta \cdot C_{n-2} + \ldots)/(\alpha + \beta + \delta + \ldots) \quad \text{(Equation 2)}$$

Each of the second color values may have equal weight or a second color value extracted from a more recent video frame (closer to the current frame) may be given a higher weight, for example. In this alternative embodiment, a second color value only represents colors in a single video frame. In a further alternative embodiment, a recursive filter is used and the average color is determined from the first color value and multiple second color values.

Figure 5:
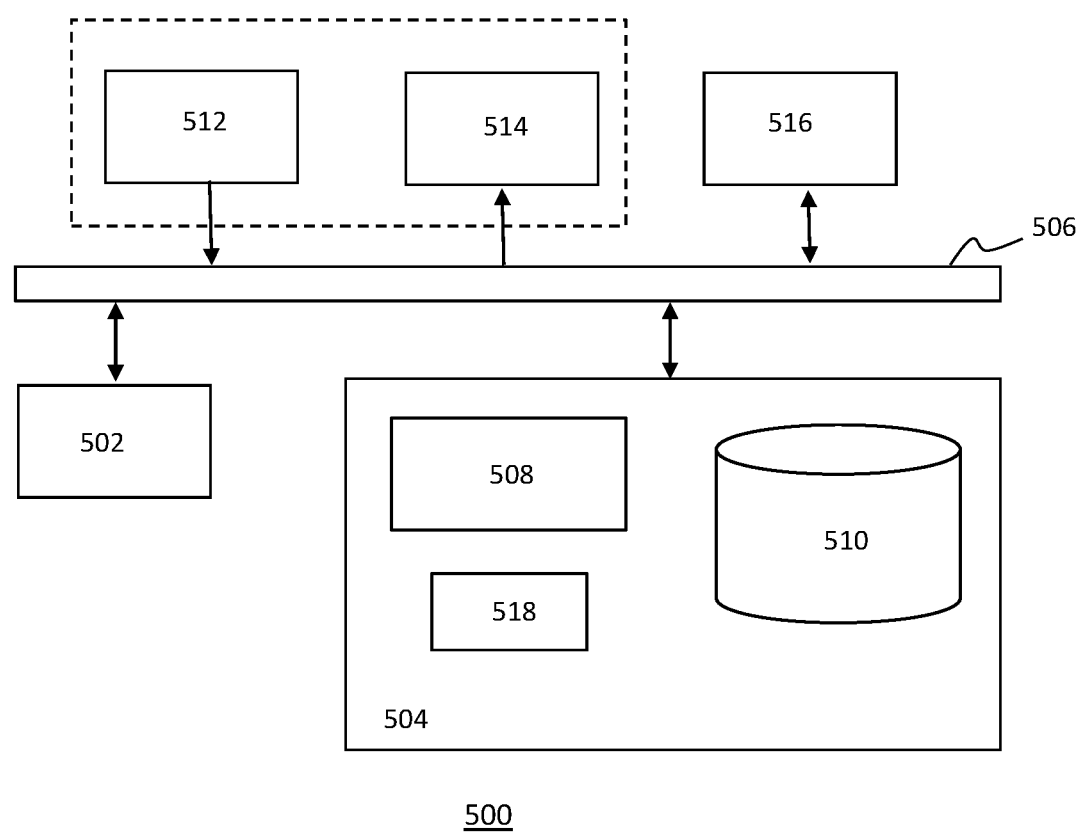
FIG. 5 depicts an example of a function which assigns weights to pixels of a super frame for determining a single color from these pixels.

FIG. 5 depicts a block diagram illustrating an exemplary data processing system that may perform the method as described with reference to FIG. 2.

As shown in FIG. 5, the data processing system 500 may include at least one processor 502 coupled to memory elements 504 through a system bus 506. As such, the data processing system may store program code within memory elements 504. Further, the processor 502 may execute the program code accessed from the memory elements 504 via a system bus 506. In one aspect, the data processing system may be implemented as a computer that is suitable for storing and/or executing program code. It should be appreciated, however, that the data processing system 500 may be implemented in the form of any system including a processor and a memory that can perform the functions described within this specification.

The memory elements 504 may include one or more physical memory devices such as, for example, local memory 508 and one or more bulk storage devices 510. The local memory may refer to random access memory or other non-persistent memory device(s) generally used during actual execution of the program code. A bulk storage device may be implemented as a hard drive or other persistent data storage device. The processing system 500 may also include one or more cache memories (not shown) that provide temporary storage of at least some program code in order to reduce the quantity of times program code must be retrieved from the bulk storage device 510 during execution. The processing system 500 may also be able to use memory elements of another processing system, e.g. if the processing system 500 is part of a cloud-computing platform.

Input/output (I/O) devices depicted as an input device 512 and an output device 514 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 5 with a dashed line surrounding the input device 512 and the output device 514). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 516 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 500, and a data transmitter for transmitting data from the data processing system 500 to said systems, devices and/or networks. Modems, cable modems, and Ethernet cards are examples of different types of network adapter that may be used with the data processing system 500.

As pictured in FIG. 5, the memory elements 504 may store an application 518. In various embodiments, the application 518 may be stored in the local memory 508, the one or more bulk storage devices 510, or separate from the local memory and the bulk storage devices. It should be appreciated that the data processing system 500 may further execute an operating system (not shown in FIG. 5) that can facilitate execution of the application 518. The application 518, being implemented in the form of executable program code, can be executed by the data processing system 500, e.g., by the processor 502. Responsive to executing the application, the data processing system 500 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 502 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for determining a light effect to be rendered while media content is being rendered, said light effect being determined based on an average of a plurality of color values, said plurality of color values being extracted from a plurality of frames of said media content, said system comprising:
at least one input interface;
at least one output interface; and
at least one processor configured to:
use said at least one input interface to obtain media content information comprising media content, determine a first color value based on a color value extracted from a current frame of said media content, determine one or more second color values based on one or more color values extracted from a plurality of previous sequential frames of said media content, detect a transition in said media content and/or in a rendering of said media content, adjust a first weight for weighting said first color value in a calculation of an average color, adjust one or more second weights for weighting said one or more second color values in said calculation of said average color, and/or adjust said one or more second values upon detecting said transition in said media content, calculate said average color from said weighted first color value and said one or more weighted second color values, determine one or more light effects based on said average color, and use said at least one output interface to control one or more lighting devices to render said one or more light effects and/or store a light script specifying said one or more light effects.

2. A system as claimed in claim 1, wherein said at least one processor is configured to:

detect said transition by detecting that normal rendering of said media content is resumed after an interruption of said rendering, and adjust said first weight, said one or more second weights, and/or said one or more second values upon detecting that said normal rendering is resumed.

3. A system as claimed in claim 1, wherein said transition comprises a transition between said media content being paused, fast forwarded, reversed or skipped and said media content being rendered normally.

4. A system as claimed in claim 1, wherein said transition comprises a change in a level of activity in said media content.

5. A system as claimed in claim 1, wherein said transition comprises a transition between shots and/or scenes in said media content.

6. A system as claimed in claim 1, wherein said at least one processor is configured to replace said one or more second color values by said first color value.

7. A system as claimed in claim 1, wherein said at least one processor is configured to replace said one or more second color values by one or more color values transmitted to said one or more lighting devices before said transition.

8. A system as claimed in claim 1, wherein said at least one processor is configured to reduce said one or more second weights or increase said first weight.

9. A system as claimed in claim 8, wherein said at least one processor is configured to reduce said one or more second weights to zero.

10. A system as claimed in claim 1, wherein said one or more second color values comprise an average of a color value extracted from a preceding frame and a color value based on a plurality of colors values extracted from a plurality of sequential frames preceding said previous frame.

11. A system as claimed in claim 1, wherein said one or more second color values are at least based on a plurality of color values extracted from a plurality of sequential frames rendered immediately preceding said transition.

12. A system as claimed in claim 1, wherein said at least one processor is configured to calculate said average color by calculating a mean, trimean, median or mode color from said first color value and said one or more second color values.

13. A method of determining a light effect to be rendered while media content is being rendered, said light effect being determined based on an average of a plurality of color values, said plurality of color values being extracted from a plurality of frames of said media content, said method comprising:

obtaining media content information comprising media content;

determining a first color value based on a color value extracted from a current frame of said media content;

determining one or more second color values based on one or more color values extracted from a plurality of previous sequential frames of said media content;

detecting a transition in said media content and/or in a rendering of said media content;

adjusting a first weight for weighting said first color value in a calculation of an average color, adjusting one or more second weights for weighting said one or more second color values in said calculation of said average color, and/or adjusting said one or more second values upon detecting said transition in said media content;

calculating said average color from said weighted first color value and said one or more weighted second color values;

determining one or more light effects based on said average color; and controlling one or more lighting devices to render said one or more light effects and/or storing a light script specifying said one or more light effects.

14. A nontransitory computer program or suite of computer programs comprising at least one software code portion or a computer program product storing at least one software code portion, the software code portion, when run on a computer system, being configured for enabling the method of claim 13 to be performed.

* * * * *